(12) United States Patent
Mallebrein et al.

(10) Patent No.: US 8,505,518 B2
(45) Date of Patent: Aug. 13, 2013

(54) METHOD FOR OPERATING AN INTERNAL COMBUSTION ENGINE

(75) Inventors: Georg Mallebrein, Korntal-Muenchingen (DE); Crina Vlad, Stuttgart (DE); Jochen Reiter, Waiblingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/998,306

(22) PCT Filed: Aug. 31, 2009

(86) PCT No.: PCT/EP2009/061187
§ 371 (c)(1),
(2), (4) Date: Jul. 6, 2011

(87) PCT Pub. No.: WO2010/040600
PCT Pub. Date: Apr. 15, 2010

(65) Prior Publication Data
US 2011/0253079 A1    Oct. 20, 2011

(30) Foreign Application Priority Data
Oct. 7, 2008  (DE) .......................... 10 2008 042 638

(51) Int. Cl.
*F02D 41/14*    (2006.01)
(52) U.S. Cl.
USPC ........................................................ 123/572
(58) Field of Classification Search
USPC ............... 123/572–574, 41.86, 510; 60/674, 60/274
See application file for complete search history.

(56) References Cited

U.S. PATENT DOCUMENTS

| | | | | |
|---|---|---|---|---|
| 3,662,724 | A * | 5/1972 | Ohar et al. | 123/574 |
| 4,570,603 | A * | 2/1986 | Piedrafita | 123/510 |
| 5,438,967 | A | 8/1995 | Ito | |
| 5,546,918 | A * | 8/1996 | Mayer et al. | 123/674 |
| 5,555,858 | A * | 9/1996 | Katoh | 123/73 SC |
| 5,813,224 | A * | 9/1998 | Rao et al. | 60/274 |
| 6,318,075 | B1 * | 11/2001 | Gunther et al. | 60/285 |
| 7,712,457 | B2 * | 5/2010 | Porten et al. | 123/572 |
| 2002/0104508 | A1 | 8/2002 | Atago et al. | |
| 2006/0201487 | A1 | 9/2006 | Mallebrein | |
| 2008/0257320 | A1 * | 10/2008 | Asanuma et al. | 123/573 |
| 2009/0126709 | A1 * | 5/2009 | Manookian, Jr. | 123/574 |
| 2010/0012103 | A1 * | 1/2010 | Lewis et al. | 123/574 |
| 2010/0101514 | A1 * | 4/2010 | Hirano et al. | 123/41.86 |
| 2010/0101546 | A1 * | 4/2010 | Manookian, Jr. | 123/573 |
| 2010/0139634 | A1 * | 6/2010 | Wade | 123/574 |

FOREIGN PATENT DOCUMENTS

| | | |
|---|---|---|
| CN | 1145978 | 3/1997 |
| EP | 1 944 490 | 7/2008 |
| JP | 4-234543 | 8/1992 |
| JP | 4-308336 | 10/1992 |
| JP | 2005-42575 | 2/2005 |
| JP | 2006009597 | 1/2006 |
| JP | 2006144584 | 6/2006 |
| JP | 2006177288 | 7/2006 |
| JP | 2007-127076 | 5/2007 |
| JP | 2007-192113 | 8/2007 |
| JP | 2008202554 | 9/2008 |
| WO | WO 2005/080775 | 9/2005 |

* cited by examiner

*Primary Examiner* — M. McMahon
(74) *Attorney, Agent, or Firm* — Kenyon & Kenyon LLP

(57) ABSTRACT

In a method for operating an internal combustion engine, a crankcase of the internal combustion engine has a vent into the intake section of the internal combustion engine, and upon outgassing of fuel out of engine oil present in the crankcase, the operating point of the internal combustion engine is modified so that the air-fuel ratio does not fall below a definable value.

2 Claims, 5 Drawing Sheets

METHOD FOR OPERATING AN INTERNAL COMBUSTION ENGINE

BACKGROUND OF THE INVENTION

1. Field of the Invention

The present invention relates to a method for operating an internal combustion engine, in which a crankcase of the internal combustion engine has a vent into the intake section of the internal combustion engine.

2. Description of Related Art

The crankcase of an internal combustion engine is not permanently sealed. A small amount of gas flows past the piston rings and, without an opening in the crankcase, would create a high pressure therein. This pressure buildup is avoided by way of the so-called crankcase vent. The crankcase vent directs gases out of the crankcase into the intake duct and thus into the intake section of the internal combustion engine. A direct connection to intake duct vacuum is avoided, since otherwise the crankcase would be brought to the pressure level of the intake duct.

Not only are combusted "blow-by" gases pushed via the piston rings into the crankcase, but also, especially when the engine is cold, fuel is introduced into the engine oil that is present, for example, in an oil sump or the like in the crankcase. This fuel is, as a rule, excess injected fuel that does not participate in combustion but instead, for example, condenses on the cylinder walls or is not even vaporized.

This fuel introduced into the crankcase is at first, when the engine is cold, washed into the engine oil. As the engine oil heats up, this fuel evaporates. The vapors then flow through the crankcase vent into the intake duct and then into the combustion chambers. This additional fuel stream results in richer engine operation. Especially at idle, the fuel stream can account for a very large portion of the idle fuel consumption of the internal combustion engine. In contrast to the fuel vapor stream from the tank vent, the fuel vapor steam through the crankcase vent is generally not controllable. In other words, a crankcase ventilation valve that is, for example, electrically controllable generally is not present.

The problem of outgassing from the engine oil is very pronounced with fuel having a high ethanol content. Such fuels are increasingly being used for the operation of vehicles having a spark-ignited engine. Such vehicles are called "flex-fuel" vehicles (FFVs). Pure ethanol is called E100, pure gasoline E0, and any mixture is referred to as EX. In Europe and the United States, usual ethanol-containing fuels contain approximately 75 to 85% ethanol (E85 blend). The remainder (15 to 25%) is gasoline.

It is known that ethanol is more difficult to vaporize at low temperatures than pure gasoline. When E85 is used, considerably more fuel therefore needs to be injected for a cold start than in the case of pure gasoline. The result of this is that during a cold start and in the warmup phase, considerably more fuel is scraped off by the piston rings into the engine oil than in the case of operation with pure gasoline. Because ethanol is a pure substance having a fixed boiling point (78° C.), this added fuel then outgases quite abruptly as the oil heats up. At low load speeds and in particularly at idle, this results in a significant enrichment that cannot always be managed with the lambda control system alone. Especially when frequent extreme cold starts are performed without allowing the engine oil to heat up, a great deal of fuel can collect in the engine oil. Levels of 200 to 500 ml of fuel in the engine oil have been routinely observed.

If the internal combustion engine is warmed up in a short period of time (e.g. using heavy load and at high speed) with such a large input of fuel into the engine oil, and is then operated at idle, the volumetric flow of the exhaust gas often cannot be managed. Further leaning by way of the injection valves is then often impossible, since the minimum injection time has already been reached. In addition, a maximum fuel proportion of, for example, 60% must not be exceeded.

BRIEF SUMMARY OF THE INVENTION

An object of the present invention is to provide a method that enables the operation of an internal combustion engine even at very high rates of fuel outgassing from the engine oil.

This problem is solved by a method for operating an internal combustion engine, in which a crankcase of the internal combustion engine has a vent into the intake section of the internal combustion engine, the operating point of the internal combustion engine being modified, upon outgassing of fuel out of engine oil in the crankcase, so that the air-fuel ratio does not fall below a definable value. The air-fuel ratio can be, for example, the enrichment limit. An operating point that has the highest possible fuel consumption is therefore deliberately selected. The outgassing of fuel can be identified, for example, by observing the lambda control system, since upon outgassing, an enrichment of the fuel-air mixture can be observed, and this will generate a controller intervention toward a leaner mixture. Alternatively or additionally, it is possible to observe the engine oil temperature; considerable outgassing of fuel may be expected upon attainment of the boiling limit for ethanol (i.e. approximately 78° C.). The enrichment limit is a lambda value less than 1, at which reliable mixture ignition can still just be ensured.

The operating point of the internal combustion engine is preferably modified so that an elevated fuel consumption results. For this purpose, the ignition efficiency is preferably decreased. A decrease in ignition efficiency is produced, for example, by retarding the ignition. In a refinement of the invention, provision is additionally made that a target idle speed is raised. The fuel consumption can thereby be further increased.

The target injection quantity is preferably reduced in such a way that the sum of the target injection quantity and an additionally delivered outgassed fuel quantity results in a lambda value of approximately 1. Provision is preferably further made that the minimum definable air-fuel ratio represents an enrichment limit. Alternatively, provision is made that the minimum definable air-fuel ratio represents the stoichiometric air-fuel ratio lambda=1. A lower limit is placed on the injection quantity such that the injection time does not fall below a minimum value. The injection quantity is therefore preferably kept sufficiently high that it remains controllable in both directions, so that lambda control also continues to be possible by way of a reduction in injection quantity.

Provision is preferably further made that in order to increase the fuel consumption, the target filling is increased and the ignition angle efficiency is automatically decreased in order to compensate. Fuel consumption is increased by this action as well. The target air quantity relevant to the target filling is preferably increased by opening a throttle valve. Provision is preferably made that a minimum torque reserve for increasing the target filling is determined based on the minimum injection time and based on the present outgassing mass flow rate. The torque reserve is the difference between the torque that would be present at the crankshaft at the present air mass flow rate and injection quantity, and the driver's torque request. It is therefore, effectively, the torque that must be dissipated by an unfavorable selection of combustion parameters.

Especially in a context of moderate and high outgassing, provision is made that, in particular in coasting mode, an injection blank-out function is suppressed. In this situation, the consequence of an injection blank-out would be that uncombusted fuel would travel through the intake section into the cylinder and be discharged again through the exhaust system. Provision is additionally made here that ignition is maintained, and the outgassing fuel is further combusted. For this, the amount of fuel injected is exactly enough to produce an ignitable mixture. The operating point is set, in this context, so that the lowest possible drive torque is generated by the internal combustion engine.

In an alternative embodiment of the method, provision is made that upon outgassing in coasting mode, ignition is switched off. This is advantageous in particular when the outgassing rate that exists is so high that the only operating point possible for the internal combustion engine is one with a crankshaft torque that would be too high for coasting mode. In this case a throttle valve is preferably maximally closed so that substantially only uncombusted fuel is passed through.

DETAILED DESCRIPTION OF THE INVENTION

Figure 1:
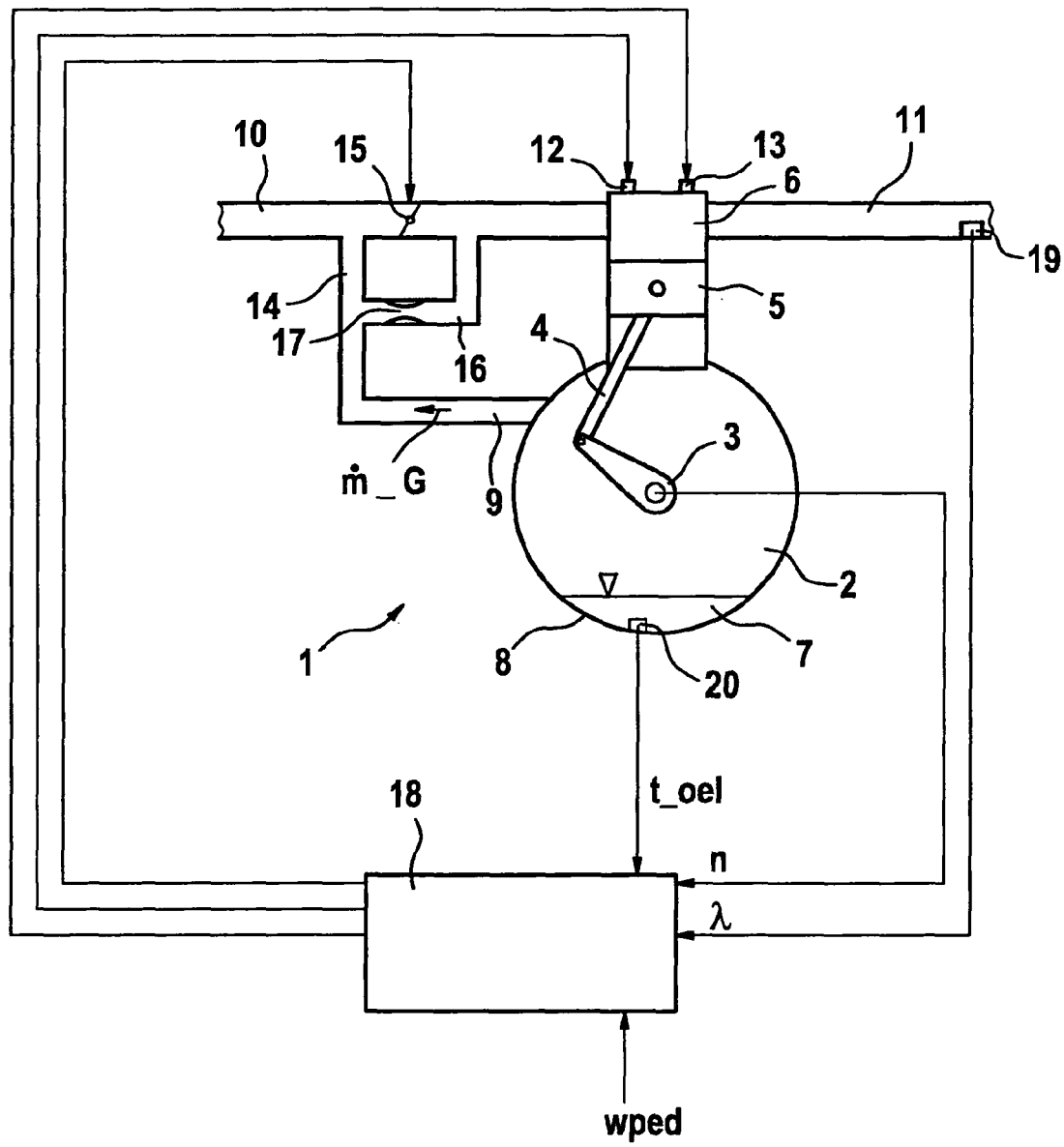
FIG. 1 shows a sketch of an internal combustion engine.

FIG. 1 is a sketch of an internal combustion engine 1 having a crankcase 2 in which a crankshaft 3 is disposed. Crankshaft 3 is connected via a connecting rod 4 to a piston 5 that is disposed movably back and forth on cylinder 6. For simplicity's sake, only one cylinder of the internal combustion engine is depicted here; the internal combustion engine usually possesses several, for example four or six, cylinders. Present in crankcase 2 is engine oil 7 that is delivered, via conduits and pumps not depicted here, to the respective lubrication points, among others the running surface of piston 5 in cylinder 6. The engine oil collects in an oil sump 8. In order to dissipate excess pressure in crankcase 2, the latter is connected via a vent 9 to intake section 10 of the internal combustion engine. Ambient air is aspirated in known fashion via intake section 10 into cylinder 6, and combustion gases are discharged back into the environment via a schematically depicted exhaust system 11.

Each cylinder 6 has associated with it an injection valve 12 that is controlled e.g. electrically and is connected to a high-pressure rail, as well as an electrical spark plug 13. The vent branches into a main conduit 14 that is connected to an intake section 10 upstream from a throttle valve 15, and a secondary conduit 16 having a smaller cross section; this is characterized here by a schematically depicted restrictor 17 that is connected to intake section 10 downstream from throttle valve 15.

A control unit 18 controls the operating state of the internal combustion engine. An accelerator pedal angle wped, as well as the crankshaft rotation speed n and the lambda value $\lambda$ measured by way of a lambda sensor 19 disposed in the exhaust system, are applied to control unit 18 on the input side.

Further input variables such as, for example, the throttle valve position, intake air pressure and temperature, and the like, are not depicted here in the interest of simplicity. Present on the output side are, among others, control signals for injection valve 12, spark plug 13, and the position of throttle valve 15. The oil temperature T_OL is sensed using an oil temperature sensor 20.

The mass flow rate $\dot{m}\_G$ of the fuel outgassing from engine oil 7 is determined from the oil temperature T_OL and from a model (not depicted in the interest of simplicity) of the fuel mass currently present in the engine oil.

Figure 2:
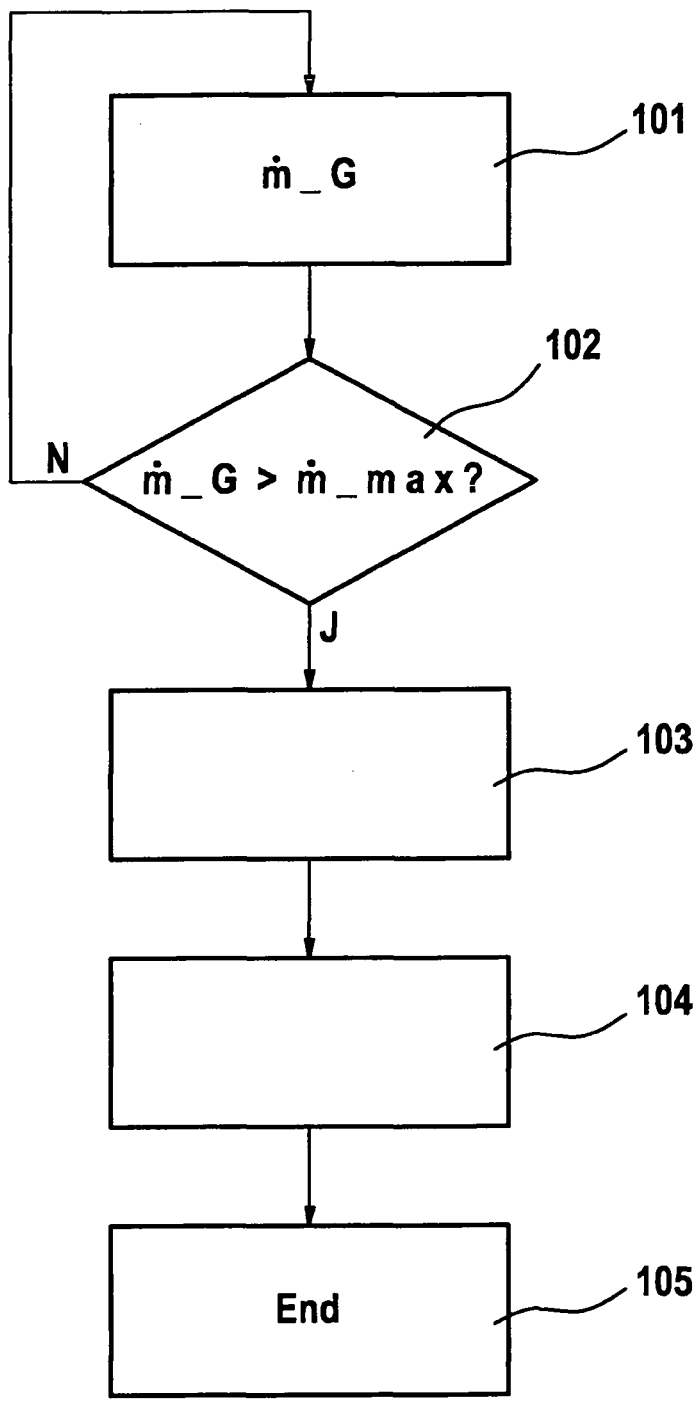
FIG. 2 shows an exemplifying embodiment of a method according to the present invention as a flow chart.

FIG. 2 shows an exemplifying embodiment of a method according to the present invention, with reference to a flow chart. In a first step 101, the mass flow rate $\dot{m}\_G$ of the outgassing fuel is determined. A second step 102 checks whether this value is greater than an upper limit $\dot{m}\_{max}$. If this is not the case (labeled as option N), execution branches back to step 101 and the mass flow rate $\dot{m}\_G$ is determined again. If the query in step 102 indicates that the mass flow rate $\dot{m}\_G$ is greater than the permissible limit $\dot{m}\_{max}$, this is labeled as option J. In a step 103, the ignition angle is shifted to an ignition efficiency that is as poor as possible. This can be achieved, for example, by maximum ignition retardation. In a step 104, the idle speed $n_L$ is then raised. The method ends at step 105. Adaptation of the fuel quantity that is actually to be injected occurs, so to speak, automatically by way of the lambda control loop (not depicted here). By regulating the lambda value $\lambda$ to a value as close as possible to 1, the fuel quantity to be injected is reduced when outgassing fuel is introduced into the cylinder by the volumetric flow $\dot{m}\_G$. As a result of the action proposed here, even very large quantities of outgassing fuel do not result in excessive demands on the control system and consequently in a lambda value<1 that can no longer be corrected back to 1.

The method presented above can also be implemented in an operating state with a torque reserve. The torque reserve increases the target filling in the filling path. For this, throttle valve 15 is opened so that the internal combustion engine has more air and—via the injection control system or lambda control system—also more fuel delivered to it. In the ignition path, however, the result of this is that the target ignition angle efficiency is decreased, since the optimum torque (based on engine filling) has increased. The internal combustion engine is therefore operated with a high fuel demand and higher filling, while the torque at the crankshaft remains unchanged.

Figure 3:
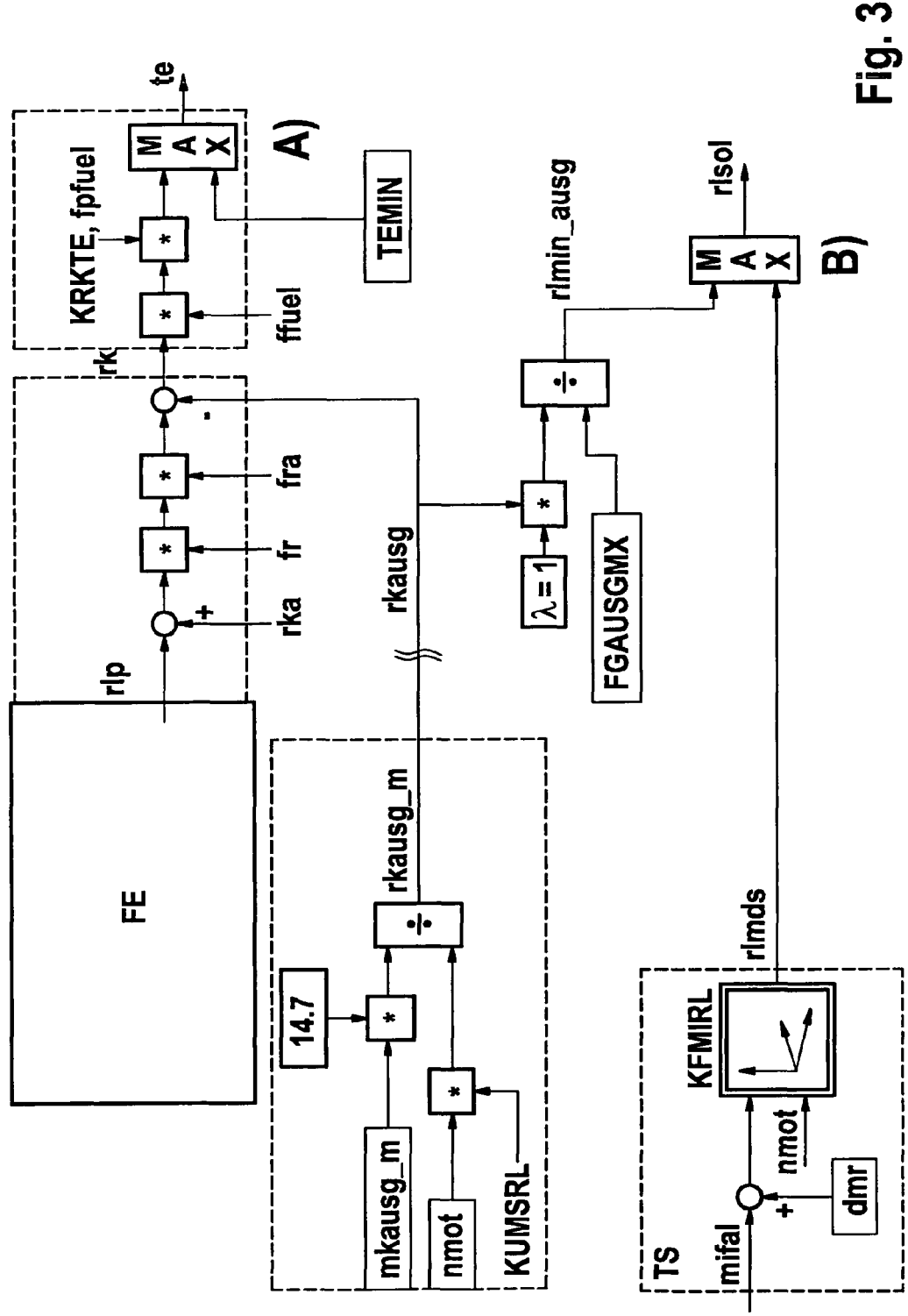
FIG. 3 shows a further exemplifying embodiment of a method according to the present invention.
Figure 4:
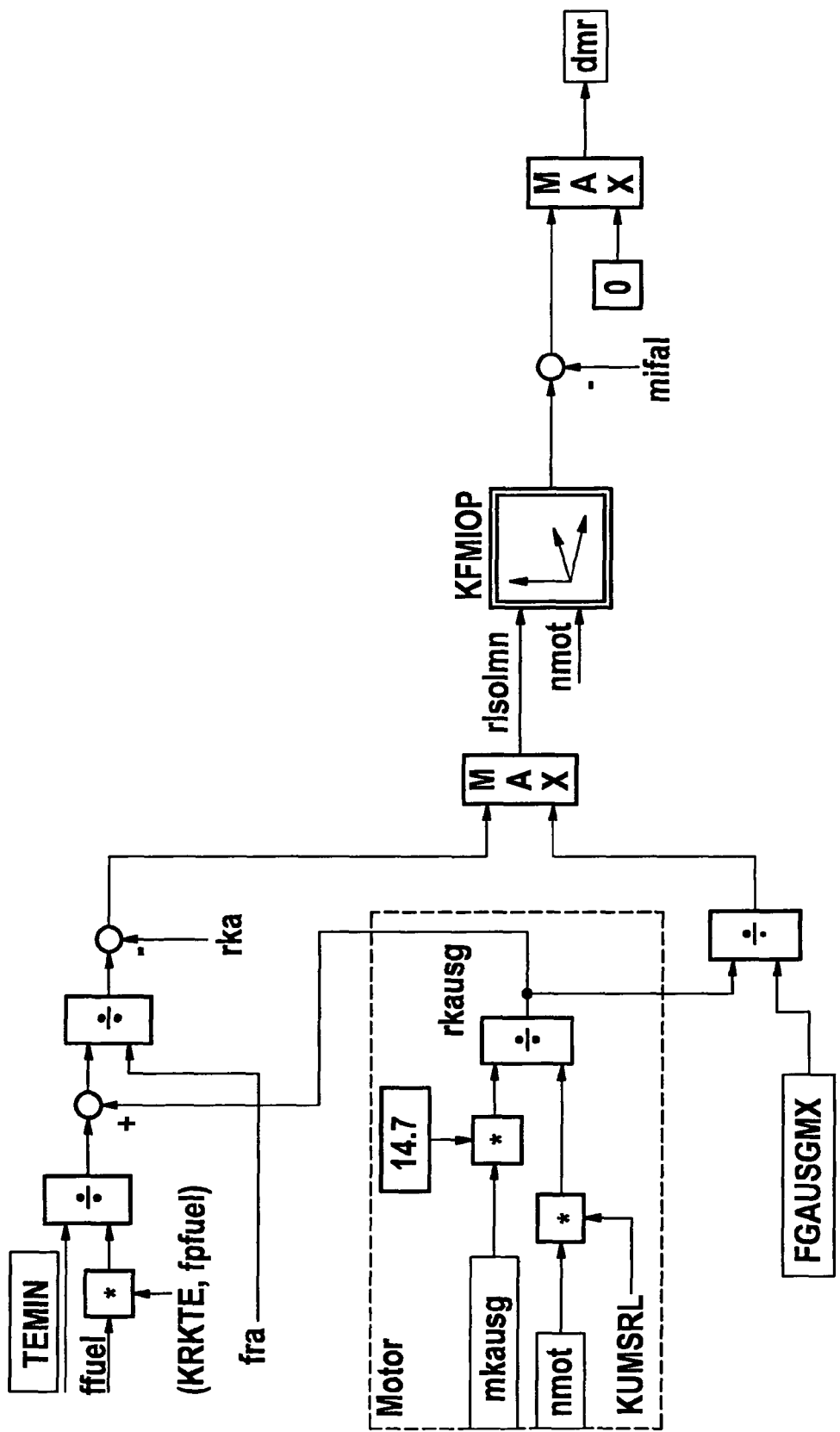
FIG. 4 shows a further exemplifying embodiment of a method according to the present invention.

FIG. 3 and FIG. 4 show an exemplifying embodiment of a method of this kind according to the present invention. FIG. 3 shows the portion of the method for determining the target filling rlsol and injection time te, and FIG. 4 depicts the portion of the method for determining a torque reserve dmr. FIG. 3 will be discussed first. In an upper path, in a block FE the predicted fresh air filling rlp is identified. The offset of the relative fuel proportion of the mixture adaptation rka is added to this value; the value is also then multiplied by the factor for regulating the mixture adaptation fra, and the lambda control factor fr. In the center path in FIG. 3 the mass flow rate of the outgassing mkausg_m, i.e. the value of the real mass flow rate in the engine, and the engine speed nmot, are used to identify a relative fuel proportion due to outgassing from the oil rkausg_m. This is subtracted from the value ascertained in the upper path, yielding the fuel quantity rk. From this, in consideration of a correction factor to take into account a stoichiometry factor of the fuel ffuel and a correction factor for the fuel pressure fpfuel, a value te for the injection duration is calculated. A lower limit TEMIN is imposed on this.

In the lower path in FIG. 3, a filling target value rlmds is in turn calculated from the previously known characteristics field KFMIRL, based on the driver's torque request mifal, the torque reserve dmr, and the crankshaft rotation speed nmot. From the relative fuel proportion due to outgassing rkausg determined in the center path, and from a maximum outgassing fuel proportion fgausgmx, a minimum value for the target filling rlmin_ausg is identified. From this value and from the target filling value rlmds, a minimum value for the target filling rlsol is calculated by way of a maximum-value selection, and is then used to apply control to the throttle valve.

FIG. 4 illustrates determination of the torque reserve during outgassing. In an upper path, a first value for the minimum target filling is determined from the minimum injection time TEMIN and from further values such as the control and related mixture factor fra, the offset of the relative fuel proportion of the mixture adaptation function rka, and further values. In the center path, a relative fuel proportion due to outgassing rkausg is identified; this is used again in both the upper and the lower path. The determination is made based on the outgassing mass flow rate mkausg, engine speed nmot, and a constant KUMSRL to convert the mass flow rate into a filling value. A maximum selection operation is used to determine the minimum target filling, which is then converted, together with the engine speed nmot, into a torque using the characteristics field KFMIOP. The driver's torque request mifal is subtracted from this torque. The difference is subjected to a lower limit value of 0, and represents the torque reserve dmr.

Figure 5:
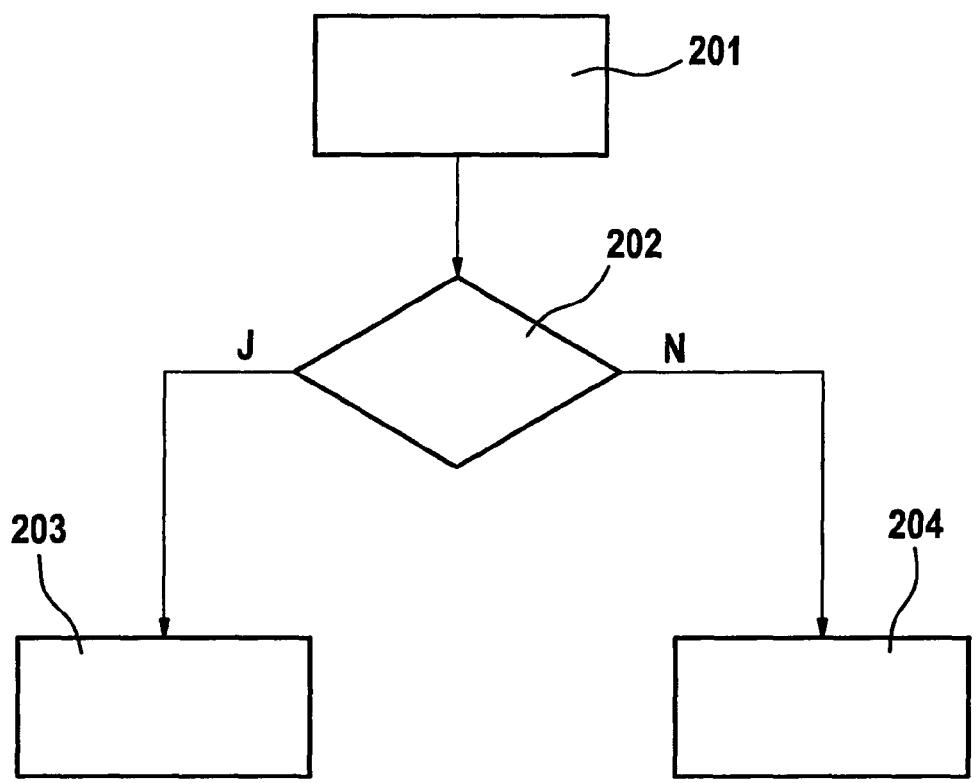
FIG. 5 shows a further exemplifying embodiment of a method according to the present invention.

FIG. 5 shows a further exemplifying embodiment of a method according to the present invention with reference to a block diagram. In a step 201, operation transitions into coasting mode, in which the driver's torque request equals zero (i.e. the driver is not actuating the accelerator pedal). The drivetrain is engaged, and the engine speed is greater than a lower threshold. In coasting mode, injection is usually switched off, i.e. suppressed. The ignition system remains active, so that residual fuel in the cylinder is also combusted. In the case of a cylinder cutoff for torque reduction, a high level of outgassing must not result in a continuation of engine operation using fuel through the crankcase vent. To avoid this, a prohibition on injection system cutoff is activated at moderate and high outgassing. For this, firstly a determination is made in step 202 as to whether a moderate or high outgassing rate exists. This is done by comparing the measured or simulated outgassing rate with a maximum threshold. If the outgassing rate is higher (indicated as option J), then a moderate to high outgassing rate exists, and in a step 203 a prohibition on injection system cutoff is set, for example by way of a characterizing bit in a control unit. If an excessive outgassing rate is not present (indicated as option N), then in step 204 injection blank-out is permitted; this can likewise be implemented using a corresponding characterizing bit. The boundary conditions in this context are that the necessary braking torque must continue to be able to be established while coasting. The injection valves must be activated and the injection time must be greater than TEMIN (the minimum permitted injection time for complying with the tolerance requirement). The ignition angle must not go below the latest possible limit, and the lambda value can be allowed, in an extreme case, to drop to the enrichment limit.

With extremely high outgassing, the aforementioned conditions can no longer be maintained at engine speeds below a threshold, since too large a proportion of fuel is being delivered by outgassing. With extreme outgassing of this kind, the method depicted with reference to FIG. 5 is modified. Injection blank-out is now permitted in every case; in addition, ignition is switched off and the throttle valve is opened to maximum. At extremely high outgassing, so much fuel is being introduced into the intake section that it can no longer be combusted without generating a drive torque. Switching off the ignition therefore prevents uncontrolled combustion in the combustion chamber; this is accompanied by maximum closing of the throttle valve in order to avoid a fresh air mass flow rate that is damaging to the catalytic converter.

What is claimed is:

1. A method for operating an internal combustion engine having a crankcase, wherein the crankcase has a vent leading into an intake section of the internal combustion engine, the method comprising:
    upon outgassing of fuel out of engine oil present in the crankcase, modifying an operating point of the internal combustion engine to ensure (i) the air-fuel ratio does not fall below a predefined minimum value and (ii) an increase in fuel consumption results;
    wherein the modification of the operating point includes raising a target idle speed.

2. A method for operating an internal combustion engine having a crankcase, wherein the crankcase has a vent leading into an intake section of the internal combustion engine, the method comprising:
    upon outgassing of fuel out of engine oil present in the crankcase, modifying an operating point of the internal combustion engine to ensure (i) the air-fuel ratio does not fall below a predefined minimum value and (ii) an increase in fuel consumption results;
    wherein the modification of the operating point includes reducing a target injection quantity in such a way that the sum of the target injection quantity and an additionally delivered outgassed fuel quantity results in a lambda value of approximately 1.

* * * * *

UNITED STATES PATENT AND TRADEMARK OFFICE
CERTIFICATE OF CORRECTION

PATENT NO. : 8,505,518 B2
APPLICATION NO. : 12/998306
DATED : August 13, 2013
INVENTOR(S) : Mallebrein et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 149 days.

Signed and Sealed this
Fifteenth Day of September, 2015

Michelle K. Lee
*Director of the United States Patent and Trademark Office*